Dec. 1, 1942.          G. L. TAWNEY          2,303,511
HARMONIC GENERATOR
Filed Nov. 28, 1940
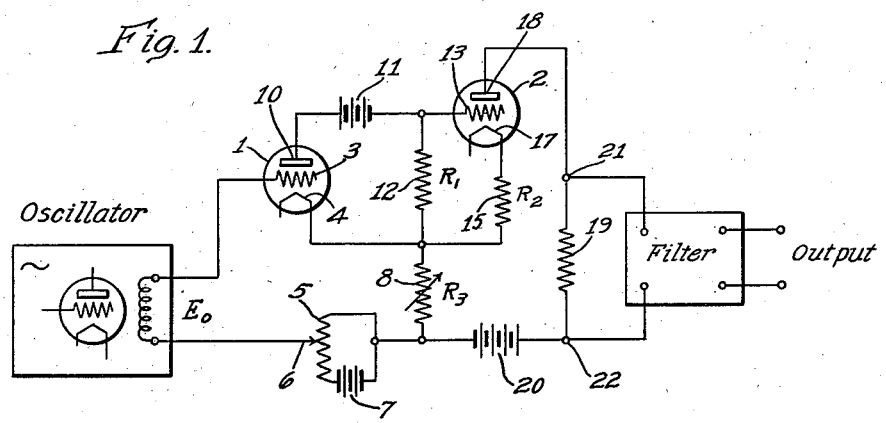
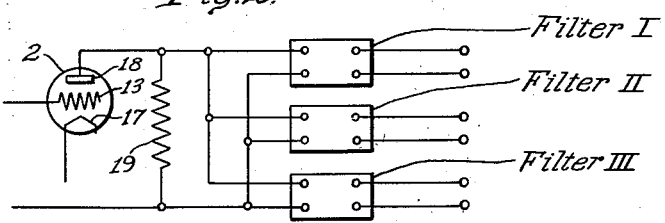
WITNESSES:
C. J. Weller.
W. S. Bartholf
INVENTOR
Gereld L. Tawney.
BY
Hymen Diamond
ATTORNEY Patented Dec. 1, 1942

2,303,511

UNITED STATES PATENT OFFICE 2,303,511

HARMONIC GENERATOR

Gereld L. Tawney, Pittsburgh, Pa., assignor to Westinghouse Electric & Manufacturing Company, East Pittsburgh, Pa., a corporation of Pennsylvania Application November 28, 1940, Serial No. 367,627

4 Claims. (Cl. 250—36)

This invention relates to the generation of high frequency currents, and, particularly, to the generation of harmonic frequencies from a fundamental.

In producing high or ultra-high frequencies the generation of a fundamental frequency rich in harmonic content may be resorted to and the desired frequencies selected from the harmonics present. Other methods of generating harmonic frequencies are known in the art, for example, frequency multipliers in cascade each tuned to a harmonic of the preceding stage. In certain systems use is made of a non-linear ferro-magnetic coil for timing the charge and discharge of a condenser. The limitations of these and other methods for the generation of harmonic frequencies is found generally in the large number of tube and circuit complements required. In the use of ferro-magnetic coils the efficiency at the higher frequencies is considerably lowered due to the presence of iron.

A particular feature of this invention is that a simple trigger circuit is employed to produce substantially square wave output voltage from which any one or more of the desired harmonic frequencies may be selected.

Another feature of the invention is that the circuit in combination with a sine wave input generator produces square waves of variable width from which very high order harmonics may be derived simply by suitable filters.

Under trigger circuits or trigger amplifiers are meant such combination of vacuum tube circuits wherein there is an abrupt change of direct output current or voltage from one stable value to another at a critical voltage of input excitation, and there is an abrupt change back to the original stable value of output voltage or current at a different critical input voltage. A trigger circuit of this type is described in Radio Review 1,143 (1919) by Eccles and Jordan.

The invention in its broader form contemplates the use of suitable trigger circuits, in general, in combination with an oscillator of sine wave output to generate an output voltage of square wave form and obtain from this output voltage harmonic frequencies of the fundamental supplied by the oscillator.

In its more specific aspects, the invention contemplates the use of a certain trigger circuit herein described in combination with a sine wave input and suitable filters in the output thereof to generate a wide band of harmonic frequency.

One of the advantages of the generating system herein described is the simplicity of the trigger circuit in which purely resistive elements form the coupling networks, and no capacities other than the tube capacities are present to limit the frequency range.

Other features and advantages will be apparent from the following description of the invention, pointed out in particularity by the appended claims, and taken in connection with the accompanying drawing, in which:

Figure 1 is a schematic circuit diagram of the particular trigger circuit employed in connection with the transformation of the sine wave output of a generator to a square wave form;

Fig. 2 shows a portion of the circuit of Fig. 1, indicating the connection of a plurality of filters to obtain different harmonic voltages.

Referring to the figures, the sine wave oscillator which supplies the trigger circuit is indicated by a conventional block diagram, inasmuch as the type of oscillator used for the purpose forms no part of the invention herein described. Any type of generator of a desired fundamental frequency may be utilized provided it has a sine wave output. Vacuum tube oscillators of various forms are admirably suited for this purpose. Similarly, the filter connected to the output of the trigger amplifier is indicated by a block diagram, since the type of filter will depend entirely upon what frequency components are intended to be obtained. Filters of the low pass, high pass or band pass type may be used as will be described later.

Referring to the trigger circuit, a pair of electron discharge tubes 1 and 2 are coupled through common impedances between their respective output and input circuits whereby a definite control action is developed by one tube upon the other, and vice versa. The input circuit of tube 1 between grid electrode 3 and cathode 4 includes in series the output terminals of the oscillator and also the particular output impedance which the oscillator may have. In series therewith is the potentiometer 5 which provides a fixed bias for the grid 3, depending upon the setting of the arm 6. The potentiometer is connected to a source of bias voltage indicated here by the battery 7. A tap of the potentiometer is connected to one terminal of the variable resistor 8, the other terminal of which connects to the cathode 4, thereby completing the grid circuit for the tube 1. The output circuit of the tube 1 between anode 10 and cathode 4 includes in series the anode supply source shown here by the battery 11 and the load resistance 12. This resistance at the junction point of the cathode 4 is connected also to the resistor 8, whereas the other terminal thereof connects to the negative side of the battery 11 as well as to the grid 13 of the tube 2. It is seen here that the input circuit of the tube 2 between grid and cathode includes, in series, the load resistor 12 aforementioned and a cathode biased resistor 15, one terminal of which connects to the junction point of resistors 12 and 8 and the other terminal to the cathode 17 of the tube 2. The output circuit of the tube 2 between anode 18 and cathode 17 includes the output load resistor 19, the anode potential source herein shown by the battery 20 and resistors 8 and 15 above described. The output of tube 2 is taken off across the resistor 19 between terminals 21 and 22 which connect to the input terminals of a filter, the final output of the system being derived from the output of the particular filter.

The operation of the circuit depends largely on the careful choice of circuit constants in order to obtain the required trigger action of operation. By proper circuit elements, the operation of the circuit will be such that a sine wave input, will result in an output voltage across the load resistor 19 of substantially square wave form. To understand the operation of the circuit, let it be assumed that there is no input voltage to the grid 3 and the potentiometer 6 is so adjusted that there is no bias. Under such circumstances, the tube 1 will draw its maximum anode current for the value of anode voltage supplied. This current flowing through the resistor 12 is of such value that the voltage drop produced will bias the grid 13 of the tube 2 to cut-off. Consequently, there is no anode current in the output circuit of the tube 2 and therefore there is no voltage drop across resistors 8 or 15 through which the anode current of the tube 2 must flow. At this point, we have then the condition that tube 2 is biased to cut-off by the anode current of tube 1, which is of uniform value until there is a voltage change in the input circuit of the tube 1 to either increase or decrease the magnitude of this current. Assuming now that the oscillator is in operation, the output voltage thereof is impressed between grid 3 and cathode 4 and at the negative half cycle of operation, as shown in Fig. 2, as the voltage is increasing, an increasingly negative bias is applied to the grid 3. The result is that the anode current lowered in consequence thereof decreases the voltage drop across the resistor 12 and thereby decreases the bias on the grid 13. A decrease of bias results in the flow of anode current through resistors 8 and 15, the voltage drop produced by this current across the resistor 8 increases the negative bias on the grid 3, and further lowers the anode current flowing in the resistor 12. This action is cumulative and the resultant sudden increase of anode current of the tube 2 drives the grid 3 due to increased voltage drop across the resistor 8 to cut-off value. The action described here is practically instantaneous so that the voltage across the resistor 19 rises suddenly to a certain maximum value determined by the cut-off point of the tube 1. This value is maintained until the reversal voltage of the oscillator, that is, until the decrease of the sine wave input of the first half cycle reaches the value which will offset the bias produced by the tube 2 and the tube 1 draws anode current resulting again in a voltage drop across the resistor 12 which decreases the anode current in tube 2. Any decrease of anode current on the other hand results in a decrease in voltage drop across resistor 8 which again decreases the negative voltage on the grid 3. This action is also cumulative and operates in the reverse direction whereby anode current is cut-off in the tube 2 and the voltage across the resistor 19 suddenly drops to zero.

The same condition exists now as the one which was assumed in starting the operation of the circuit. It is seen that for a critical value of input voltage, an abrupt change of output voltage takes place, that is, a sudden rise of output voltage from zero to a definite value and at another critical input voltage a sudden change from the value reached to the original starting value, that is, to zero, is effected.

The output across resistor 19 is a square wave and, as such, when broken up into its complements, is known to consist of the fundamental sine wave and a high order of harmonica thereof. Now if a filter of the desired characteristics is connected to the output circuit of the tube 2, any one of a series of the harmonic contents of the square wave form may be derived and utilized for whatever purpose these harmonic frequencies are intended to be applied. A sharply tuned filter, such as a crystal filter, will pass only a single harmonic frequency whereas high pass or low pass filters will pass frequencies of a certain group only.

The operating point of the tube 1 may be shifted in accordance with bias voltage values selected from both the potentiometer 5 and the resistor 8. For this purpose, the latter is made variable. The magnitude of the voltage drop of the resistor 8 within limits will govern the operating point so that a wider or narrower square wave output will be obtained. The bias voltage derived from the battery 7 is utilized by the adjustment of the arm 6 of the potentiometer 5 to move the operating point along the sine way to any desired location in the first quarter cycle of sine wave input.

In Fig. 2, the output portion of the square wave generator is shown with a plurality of filters I, II and III connected to the output circuit across resistor 19. This illustrates in particular the usefulness of the circuit as a single source for supplying continuously a number of desired frequencies as harmonica of a fundamental. These frequencies may be used for carrier currents in multi-channel carrier telephone systems, for synchronizing carriers in radio transmission, etc. The variation of bias voltages and thereby the shifting of the operating points is also effective to determine the predominance of even or odd harmonics.

What is claimed is:

1. In a system for generating harmonic frequencies from a sinusoidal wave, a tube having an anode, cathode and a control electrode, a pair of resistors and a source of direct current connected to cause current flow serially through said resistors and between said anode and cathode, a third resistor connected between said control electrode and a point between the two first mentioned resistors, a second tube having an anode, cathode and control electrode, a connection from the cathode of said second tube to a point between the two first mentioned resistors, an input circuit embodying a source for said sinusoidal wave connected between the control electrode of said second tube and a point on said two first mentioned resistors which is more remote from the cathode of the first mentioned tube than is the first-mentioned point, a source of direct current connected to cause current flow between the anode and cathode of said second tube and a connection conductive to direct current between the control electrode of the first mentioned tube and the anode of said second tube.

2. In a system for generating harmonic frequencies from a sinusoidal wave, a tube having an anode, cathode and a control electrode, a pair of resistors and a source of direct current connected to cause current flow serially through said resistors and between said anode and cathode, a third resistor connected between said control electrode and a point between the two first mentioned resistors, a second tube having an anode, cathode and control electrode, a connection from the cathode of said second tube to a point between the two first mentioned resistors, an input circuit embodying a source of said sinusoidal wave connected between the control electrode of said second tube and a point on said two first mentioned resistors which is more remote from the cathode of the first mentioned tube than is the first-mentioned point, a source of direct current connected to cause current flow between the anode and cathode of said second tube and a current path substantially devoid of electrostatic capacity between the control electrode of the first mentioned tube and the anode of the second mentioned tube.

3. In combination with a source of sinusoidal voltage, a tube having an anode, cathode and a control electrode, a pair of resistors and a source of direct current connected to cause current flow serially through said resistors and between said anode and cathode, a third resistor connected between said control electrode and a point between the two first mentioned resistors, a second tube having an anode, cathode and control electrode, a connection from the cathode of said second tube to a point between the two first mentioned resistors, an input circuit embodying said source of sinusoidal voltage connected between the control electrode of said second tube and a point on said two first mentioned resistors which is more remote from the cathode of the first mentioned tube than is the first-mentioned point, a source of direct current connected to cause current flow between the anode and cathode of said second tube and a connection conductive to direct current between the control electrode of the first mentioned tube and the anode of the second mentioned tube.

4. In combination with a source of sinusoidal voltage, a tube having an anode, cathode and a control electrode, a pair of resistors and a source of direct current connected to cause current flow serially through said resistors and between said anode and cathode, a third resistor connected between said control electrode and a point between the two first mentioned resistors, a second tube having an anode, cathode and control electrode, a connection from the cathode of said second tube to a point between the two first mentioned resistors, an input circuit embodying said source of sinusoidal voltage connected between the control electrode of said second tube and a point on said two first mentioned resistors which is more remote from the cathode of the first mentioned tube than is the first-mentioned point, a source of direct current connected to cause current flow between the anode and cathode of said second tube and a current path substantially devoid of electrostatic capacity between the control electrode of the first mentioned tube and the anode of the second mentioned tube.

GERELD L. TAWNEY.